United States Patent [19]

Sullivan

[11] Patent Number: 5,011,621
[45] Date of Patent: Apr. 30, 1991

[54] PAINT STRIPPER COMPOSITIONS CONTAINING N-METHYL-2-PYRROLIDONE AND RENEWABLE RESOURCES

[75] Inventor: Carl J. Sullivan, Exton, Pa.

[73] Assignee: Arco Chemical Technology, Inc., Wilmington, Del.

[21] Appl. No.: 532,766

[22] Filed: Jun. 4, 1990

[51] Int. Cl.⁵ .............. C09D 9/00; C11D 7/50; C23G 5/02
[52] U.S. Cl. ................... 252/162; 252/166; 252/364; 252/DIG. 8; 252/172
[58] Field of Search .............. 252/DIG. 8, 364, 162, 252/170, 172, 166

[56] References Cited

U.S. PATENT DOCUMENTS

| | | | |
|---|---|---|---|
| H 300 | 7/1987 | Hearst | 134/22.19 |
| 1,865,799 | 7/1932 | Stowie | 252/101 |
| 1,940,558 | 12/1933 | Moore | 252/167 |
| 1,974,744 | 9/1934 | Klinkenstein | 252/168 |
| 2,393,798 | 1/1946 | Morgan et al. | 252/118 |
| 2,443,173 | 6/1948 | Baum et al. | 252/127 |
| 2,968,638 | 1/1961 | Meckler | 521/40 |
| 3,673,099 | 6/1972 | Corby et al. | 252/156 |
| 4,085,059 | 4/1978 | Smith et al. | 252/118 |
| 4,120,810 | 10/1978 | Palmer | 252/153 |
| 4,276,186 | 6/1981 | Bakos et al. | 252/158 |
| 4,502,975 | 3/1985 | Kobayashi | 252/315.1 |
| 4,530,781 | 7/1985 | Gipp | 252/546 |
| 4,664,721 | 5/1987 | Valasek | 252/171 |
| 4,666,626 | 5/1987 | Francisco | 252/153 |
| 4,732,695 | 3/1988 | Francisco | 252/162 |
| 4,749,510 | 6/1988 | Nelson | 252/166 |
| 4,780,235 | 10/1988 | Jackson | 252/162 |
| 4,812,255 | 3/1989 | Suwala | 252/162 |

FOREIGN PATENT DOCUMENTS 08445 3/1988 World Int. Prop. O. .... 252/DIG. 8

Primary Examiner—Paul Lieberman
Assistant Examiner—J. E. Darland
Attorney, Agent, or Firm—Jonathan L. Schuchardt

[57] ABSTRACT

Methylene chloride-free coating remover compositions are disclosed that contain N-methyl-2-pyrrolidone and one or more plant or animal-derived oils. The compositions optionally contain a miscibilizing solvent, thickener, and surfactant. Effective, economical, low-toxicity, low-volatility coating removers that are largely biodegradable and are derived from renewable resources are provided.

18 Claims, No Drawings

PAINT STRIPPER COMPOSITIONS CONTAINING N-METHYL-2-PYRROLIDONE AND RENEWABLE RESOURCES

FIELD OF INVENTION

This invention relates to novel compositions for removing coatings based on N-methyl-2-pyrrolidone (NMP) and one or more animal or plant-derived oils. The compositions of the invention have low toxicity, low volatility, and are free of chlorinated hydrocarbons such as methylene chloride.

BACKGROUND OF THE INVENTION

Solvent-based paint removers have achieved popularity and widespread use because of their ability to easily remove fully or partially-cured coatings from substrates. Methylene chloride and other chlorinated hydrocarbons have been popular because of their effectiveness and low cost. Methylene chloride, however, is highly toxic and a suspected carcinogen. In addition, methylene chloride and other volatile halogenated compounds are environmentally undesirable due to their suspected role in the destruction of the ozone layer. Paint strippers are commonly rinsed off substrates with water; contamination of groundwater by halogenated solvents is therefore a potential health risk.

N-methyl-2-pyrrolidone (NMP) is a preferred substitute for chlorinated solvents because of its effectiveness, low toxicity, biodegradability, and high flash point. N-methylpyrrolidone typically will not "lift" paint from a substrate as rapidly as methylene chloride, but NMP has a much lower vapor pressure, and thus NMP can be used at elevated temperatures or in a soak tank. Since NMP has a low evaporation rate, lifted coatings may be readily peeled from substrates many hours after lifting. In a methylene chloride-based formulation, the lifted film will generally readhere to the substrate if the coating is not mechanically removed soon after lifting occurs. Several applications of a methylene chloride-based formulation may be necessary to completely remove thick or multiple layer coatings due to the rapid rate of solvent evaporation, while a single application of an NMP-based formulation may suffice.

A deterrent to the use of N-methyl-2-pyrrolidone as the primary solvent in coating remover formulations is the relatively high cost of NMP. Blends of NMP with less expensive, less effective solvents have been developed that have performance approximately equivalent to that of pure NMP. For example, a low toxicity paint remover containing NMP and an aromatic hydrocarbon is described in U.S. Pat. No. 4,120,810. U.S. Pat. No. 4,749,510 teaches a solvent blend effective as a coating remover in which NMP, an aromatic hydrocarbon, and formic acid are combined with surfactants, thickeners, and corrosion inhibitors. NMP has also been blended with benzyl alcohol and aromatic naphtha to obtain a useful paint remover, as taught in U.S. Pat. No. 4,732,695. U.S. Statutory Invention Registration H300 describes NMP and ethanolamine mixtures which are particularly effective on thick epoxy coatings. A paint stripper composition containing predominantly oxohexyl acetate and cyclohexanone with a minor proportion of NMP is disclosed in U.S. Pat. No. 4,666,626. A blend of NMP, alkanolamine, and an alkali or alkaline earth metal base is effective in removing paint from substrates, as shown in U.S. Pat. No. 4,276,186. U.S. Pat. No. 4,085,059 teaches a foam-type coating remover containing NMP and a water-based carrier.

N-methyl-2-pyrrolidone is clearly a preferred solvent for paint-stripping applications due to its effectiveness, low volatility, low toxicity, and biodegradability. However there is a need for inexpensive compositions comprised of a minimum amount of toxic and/or volatile substances that maintain the desirable performance characteristics of NMP. Biodegradable compositions that have little to no negative impact on the environment are also needed. In addition, there is a need for compositions derived primarily from renewable resources, such as plants and animals, rather than nonrenewable resources, such as petrochemicals.

SUMMARY OF THE INVENTION

This invention provides compositions for removing coatings comprising from about 20 to 80 weight percent of N-methyl-2pyrrolidone and from about 20 to 80 weight percent of a plant or animal-derived oil. The compositions of the invention also optionally include up to 50 weight percent of one or more cosolvents, up to 10 weight percent of a surfactant or detergent, and up to 15 weight percent of a thickener.

Although plant and animal-derived oils are not effective paint strippers when used alone, it has now been found that such oils can be combined with N-methyl-2-pyrrolidone to produce strippers that are comparable in effectiveness to NMP alone. By virtue of the presence of a substantial percentage of relatively inexpensive oil, the formulations of this invention are significantly more economical to use than formulations that rely on NMP alone.

The paint removers of this invention do not contain methylene chloride or other chlorinated solvents, and consequently they are safer to use than conventional paint strippers, which typically include these hazardous compounds.

Since plant and animal-derived oils have low volatility and low toxicity, the stripper compositions of the invention can be used more safely than conventional strippers, which often contain large proportions of volatile and/or toxic components.

Finally, the compositions of the invention are more environmentally "friendly" than conventional paint strippers, which typically contain non-biodegradable, halogenated, toxic, and/or volatile organic compounds. Since the compositions of the invention are based in part on renewable resources (i.e., plants and animals) rather than on nonrenewable resources (i.e., petrochemicals), their use results in less depletion of the environment.

DETAILED DESCRIPTION OF THE INVENTION

N-methyl-2-pyrrolidone (NMP) is the active component in the compositions of this invention. This well-known compound can be prepared by a number of synthetic routes. For example, 1,4-butanediol can be cyclodehydrogenated to give gamma-butyrolactone. Reaction of gamma-butyrolactone with methylamine yields N-methyl-2-pyrrolidone. Optimum coatings removal performance is generally obtained when the concentration of NMP is from about 60 to 80 weight percent of the composition. To maximize the cost-performance characteristics of the blend, however, the concentration of NMP may be as low as about 20 weight percent. Although NMP concentrations greater than about 80 weight percent can be used, the cost of the blend approaches that of pure NMP without a significant increase in efficacy.

The other essential component of the homogeneous blends of this invention is a plant or animal-derived oil. Any commercially available oil is suitable, and any mixture of oils may be employed. Of primary importance is usually the cost of the oil; the most preferred oils are the ones that are most readily available in sufficient quantity and least expensive. Examples of suitable oils include palm oil, peanut oil, coconut oil, cottonseed oil, linseed oil, rapeseed oil, soybean oil, corn oil, tall oil, tung oil, castor oil, sunflower oil, sesame oil, pine oil, olive oil, fish oil, and whale oil, and mixtures thereof. Fats and greases such as tallow or lard may also be included in the formulation, provided that the overall composition is a liquid at useful temperatures (usually 20° C. to 200° C.). Examples of useful oils that may be employed in the compositions of this invention may be found in Kirk-Othmer, *Encyclopedia of Chemical Technology*, 3rd. Ed., Vol 9, pp. 795–830.

The plant or animal-derived oil can be used in any amount up to about 80 weight percent. Since the oil has little stripping capability when used alone, compositions having an oil content much greater than about 80 weight percent are only marginally effective as coating removers.

The coating remover compositions of the invention may also optionally include a cosolvent or mixtures of cosolvents selected from the group consisting of aliphatic and aromatic hydrocarbons, terpenes, alcohols, glycols, carboxylic acids, aminoalcohols, nitriles, ketones, esters, glycol ethers, glycol ether esters, and mixtures thereof. These components are typically used for a variety of different purposes. Some function well as miscibilizing solvents for the other components in the formulation, while others, such as carboxylic acids and organoamines, may be effective in accelerating removal of the coatings.

The optional cosolvents and mixtures thereof may be employed in any amount up to 50 weight percent. When greater proportions of cosolvents are used, the compositions typically become less environmentally desirable due to the presence of a greater proportion of volatile and/or toxic organic compounds. A particularly preferred range for the amount of cosolvent used is from about 10 to 35 weight percent. The boiling point of the cosolvent is preferably greater than 70° C, but more preferably is greater than 100° C.

The aliphatic and aromatic hydrocarbons optionally used as cosolvents in the invention are preferably liquids at ambient temperatures, and preferably have a boiling point of greater than 100° C. in order to minimize evaporation losses after application of the blend to the coating to be removed. Examples of aliphatic hydrocarbon mixtures that may be used include mineral oil and mineral spirits. Suitable aromatic hydrocarbons include $C_1$–$C_8$ alkyl derivatives of benzene and naphthalene, such as toluene, xylenes, cumene, ethylbenzene, mesitylene, durene, and the like, and mixtures thereof. Other specific commercially available aliphatic and aromatic hydrocarbons suitable for use in this invention are described in Industrial Solvents, 3rd. Ed., E. W. Flick, Ed., Noyes Data Corp. (1985), pp. 57–83.

Terpenes that may be used as optional cosolvents include, but are not limited to, turpentine, limonene, cedrene, alpha- and beta-pinene, and the like, and mixtures thereof.

Ethers that may be used as optional cosolvents include, but are not limited to methyl tert-butyl ether, methyl phenyl ether, dibutyl ether, ethyl tert-butyl ether, and the like, and mixtures thereof.

Esters that may be used as optional cosolvents include, but are not limited to, $C_4$–$C_{12}$ aliphatic and aromatic esters such as n-butyl acetate, vinyl acetate, sec-butyl acetate, ethyl acetate, butyrolactone, amyl acetate, cyclohexyl acetate, amyl propionate, ethylene glycol monoacetate, ethylene glycol diacetate, methyl benzoate, phenyl acetate, and the like, and mixtures thereof.

Ketones useful as optional cosolvents are especially $C_5$–$C_{12}$ aliphatic and aromatic ketones. Examples of useful ketones include, but are not limited to, cyclohexanone, ethyl butyl ketone, acetophenone, methyl isobutyl ketone, methyl ethyl ketone, methyl amyl ketone, isophorone, cyclopentanone, mesityl oxide, and the like, and mixtures thereof.

Glycol ethers useful as optional cosolvents are especially $C_1$–$C_6$ alkyl mono- and diethers of $C_2$–$C_9$ alkylene glycols such as propylene glycol monomethyl ether, propylene glycol mono-t-butyl ether, ethylene glycol mono-n-butyl ether, ethylene glycol monoethyl ether, and the like, and mixtures thereof.

Glycol ether esters useful as optional cosolvents are especially $C_2$–$C_4$ carboxylic acid esters of $C_1$–$C_6$ alkyl monoethers of $C_2$–$C_9$ alkylene glycols. Exemplary glycol ether esters include, but are not limited to, diethylene glycol methyl ether acetate, propylene glycol methyl ether acetate, ethylene glycol butyl ether acetate, dipropylene glycol methyl ether acetate, and the like, and mixtures thereof.

Examples of suitable ketones, esters, glycol ethers, and glycol ether esters may be found in *Industrial Solvents* 3rd. Ed., E. W. Flick, Ed., Noyes Data Corp. (1985), pp. 410–436, 469–500, and 591–635.

Alcohols and glycols that may be used as optional cosolvents include, but are not limited to, methanol, ethanol, isopropyl alcohol, n-propanol, n-butanol, isobutyl alcohol, cyclohexanol, benzyl alcohol, ethylene glycol, propylene glycol, dipropylene glycol, diethylene glycol, triethylene glycol, and the like, and mixtures thereof.

Carboxylic acids that may be used as optional cosolvents include $C_1$–$C_{22}$ carboxylic acids (e.g., formic, acetic, propionic, oleic, oxalic).

Organoamines that may be used as optional cosolvents include, for example, ethanolamine, diethanolamine, triethanolamine, morpholine, triethylamine, and the like, and mixtures thereof.

A second optional component in the coating remover compositions of the invention is a surfactant, soap, or detergent, which may be present in order to improve wetting of the coating to be removed and hasten penetration of the active components, and/or to facilitate water rinsing and water clean-up of the substrate after removal of the coating. Anionic, cationic, nonionic, or amphoteric surfactants or combinations thereof may be utilized. Preferred surfactants include, but are not limited to, polyoxyethylene derivatives of aromatic and aliphatic alcohols, (e.g., nonyl phenoxy polyoxyethylene ethanol), alkali metal salts of $C_8$ to $C_{22}$ aliphatic sulfates, (e.g., sodium lauryl sulfate), alkali metal salts of alkyl aromatic sulfonates (e.g., sodium dodecyl benzene sulfonate), dialkyl sulfosuccinates (e.g., dioctyl sulfosuccinate), and the like, and mixtures thereof. Examples of other suitable surfactants are described in Cahn et al., "Surfactants and Detersive Systems", Kirk-Othmer, *Encyclopedia of Chemical Technology*, 3rd Ed., (1983) Vol. 22, pp. 332-432, and also in *McCutcheon's Emulsifiers and Detergents*, 1989 North American Ed., pp. 260-284. The concentration of surfactant is not critical, but is preferably from about 0.1 to 10 weight percent of the coating remover composition. A particularly preferred range is from about 1 to 5 weight percent.

A thickener may also be present in the composition of the invention to control rheological properties. Partially-dried paint is generally removed from automotive spray booths by spraying them with a coating remover. The coating remover must be thin enough to spray easily, but its viscosity must rapidly increase under low shear conditions in order for the remover to effectively cling to vertical surfaces. A higher viscosity formulation is generally desired if the coating remover is to be painted on the substrate. Low-viscosity formulations containing no thickeners are typically used when the substrate is to be soaked in a tank. Thickeners may also serve to increase the effectiveness of the coating remover by decreasing the rate of evaporation of the volatile components after application to a coated substrate. Suitable thickeners include, but are not limited to, alkylated, esterified, and oxyalkylated cellulose derivatives (e.g., ethyl cellulose, cellulose acetate butyrate, hydroxypropyl methyl cellulose, and methyl cellulose), organoclays (e.g., "Bentone 38" clay, available from NL Chemicals), fatty acid salts, fumed silica, paraffinic waxes (e.g., polyethylene wax), and the like, and mixtures thereof. The concentration of thickener employed will depend on the end use application but commonly will be from about 0.1 to 15 weight percent of the coating remover composition. A particularly preferred range is from about 3 to 10 weight percent. An aliphatic or aromatic alcohol may be employed at a concentration of up to about 20 weight percent of the composition to modify the effects of the thickener. Suitable alcohols include methanol, ethanol, isopropanol, and tert-butyl alcohol.

The compositions of this invention may be used to remove a wide variety of paints, finishes, and coatings, including, for example, alkyd enamels, acrylic enamels, polyesters, polyurethanes, epoxy resin coatings, latex paints, oil-base paints, shellacs, phenolic coatings, gum varnishes, silicone coatings, polyvinyls, polyvinyl cinnamates, polyamides, polyimides, polyalkyl acrylates, polyalkyl methacrylates, drying oils, polyvinyl acrylates, and cellulosic resins. The substrate may be of any material that is reasonably resistant to the coating remover, such as wood, glass, thermoset resin, thermoplastic resin, or metal (e.g, aluminum alloys, zinc alloys, or galvanized steel). The coated substrate may be treated with the coating remover by any suitable method, including brushing, spraying, or immersion. The treatment is most conveniently carried out at ambient temperature, but lift time may be shortened as desired by heating the coating remover and/or substrate. Temperatures of from about 20° C. to 200° C. are generally suitable. Lift time (i.e., the time at which the coating is released from the substrate) will typically be from about 1 minute to 60 minutes using the compositions of this invention. In some cases, actual lifting of the paint may not occur within 60 minutes, but the softened coating may usually be easily scraped off the substrate. After lifting, the coating and paint remover composition are removed from the substrate by any suitable means, such as mechanical action (i.e., scraping or sanding) or by rinsing with high pressure water or air.

The method by which the components of the coating remover compositions of this invention are combined is not critical. Mixing of the components can be accomplished by blending with a mechanical mixer in a tank or other similar vessel.

From the foregoing description, one skilled in the art can readily ascertain the essential characteristics of this invention, and without departing from the spirit and scope thereof, can make various changes and modifications of the invention to adapt it to various uses. The following examples are meant to illustrate the invention without limiting scope.

Examples 1-14

The coating remover compositions listed in Table 1 were prepared by combining N-methyl-2-pyrrolidone and a plant or animal-derived oil with optional solvent or thickener components, and mixing until a homogeneous blend was obtained. (Blend #12 was not homogeneous at room temperature). These blends (Blends 1-14) illustrate various compositions within the scope of the invention.

Aluminum panels (3"×6") were painted either with a white alkyd air drying enamel, or with a white epoxy-polyamide enamel, both of which were obtained from DL Laboratories (New York). One coat of approximately 1.5 mil thickness was applied. Each panel was then treated with the compositions of Table 1 in three different spots. Each spot was about 0.5 to 1.0 inch in diameter. The time necessary to obtain complete bubbling of the coating from the substrate for each spot was then measured, and the average lift time in seconds for each formulation was recorded. The results appear in Table 2.

Each of the solvent blends tested was capable of lifting a coat of alkyd paint from aluminum within about 4 minutes, and a coat of epoxy-polyamide paint from aluminum within 15 minutes.

The compositions were also tested for their ability to remove multiple coats of commercially available paint from wood. Pressure-treated pine was painted sequentially with: (a) one coat of white shellac (aged 14 hours), (b) two coats of white alkyd semi-gloss (aged 1 week), (c) two coats of red, flat, outdoor acrylic (aged 1 week), (d) one coat of black, outdoor, alkyd semi-gloss (aged 4 days), (e) one coat of white shellac (aged 1 day), and (f) one coat of white, flat vinyl acrylic (aged 1 month). The stripper compositions of Table 1 were applied to the wood samples in the same manner as described above. The average lift times in minutes also appear in Table 2.

Lift times in the case of stripping multiple coating layers from wood ranged from about 20 minutes to 2 hours. Even in the examples where actual lifting of the coating was not achieved, the softened coating could be easily removed by scraping.

These examples demonstrate the effectiveness of coating remover compositions based primarily or totally on mixtures of NMP and plant or animal-derived oils.

Examples 15-23

Table 3 illustrates various other coating remover compositions within the scope of this invention. These examples show how a variety of plant and animal-derived oils can be combined with N-methyl-2-pyrrolidone, surfactants, and thickeners to produce useful coating remover compositions.

In order to prepare the blends, N-methyl-2-pyrrolidone is combined with the oil and other components in any desired order, and the mixture is blended until a homogeneous composition is obtained. The performance of Blends 15–23 (Table 3) is expected to be similar to that of Blends 1–14.

TABLE 1

COATING REMOVER COMPOSITIONS

| Component (parts by weight) | BLEND NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| N-methyl-2-pyrrolidone | 100 | 50 | 40 | 40 | 33 | 40 | 35 | 40 | 20 | 30 | 30 | 30 | 30 | 30 |
| Soybean Oil | — | 50 | 40 | 60 | 33 | 50 | 50 | 50 | 80 | — | — | — | — | 70 |
| Corn Oil | — | — | — | — | — | — | — | — | — | 70 | — | — | — | — |
| Peanut Oil | — | — | — | — | — | — | — | — | — | — | 70 | — | — | — |
| Olive Oil | — | — | — | — | — | — | — | — | — | — | — | — | 70 | — |
| Inedible Tallow | — | — | — | — | — | — | — | — | — | — | — | 70 | — | — |
| Turpentine | — | — | 20 | — | 33 | — | — | — | — | — | — | — | — | — |
| Dipropylene glycol methyl ether acetate | — | — | — | — | — | 10 | — | — | — | — | — | — | — | — |
| Methyl tert-butyl ether | — | — | — | — | — | — | — | 10 | — | — | — | — | — | — |
| Xylene | — | — | — | — | — | — | 15 | — | — | — | — | — | — | — |
| "Aerosil R202[1]" thickener | — | — | — | — | — | — | — | — | — | 3 | 3 | 3 | 3 | 3 |

[1]Product of Degussa, Inc. (fumed silica thickener)

TABLE 2

PERFORMANCE OF COATING REMOVERS

| Blend Number (Table 1) | Lift Time (seconds) Aluminum Substrate | | Lift Time (minutes) Wood Substrate |
|---|---|---|---|
| | Alkyd | Epoxy-Polyamide | Multi-layer |
| 1 | 120 | 210 | 15 |
| 2 | 120 | 380 | 28 |
| 3 | 230 | 555 | * |
| 4 | 200 | 885 | 84 |
| 5 | 250 | 490 | * |
| 6 | 120 | 565 | 82 |
| 7 | 105 | 530 | 118 |
| 8 | 155 | 520 | 21 |
| 9 | 2880 | NT | NT |
| 10 | 380 | NT | NT |
| 11 | 270 | NT | NT |
| 12 | 370 | NT | NT |
| 13 | 230 | NT | NT |
| 14 | 295 | NT | NT |

NT = Not tested
* = Paint did not lift, but softened paint was easily scraped off after two hours.

TABLE 3

COATING REMOVER COMPOSITIONS

| Component (parts by weight) | BLEND NUMBER | | | | | | | | |
|---|---|---|---|---|---|---|---|---|---|
| | 15 | 16 | 17 | 18 | 19 | 20 | 21 | 22 | 23 |
| N-methyl-2-pyrrolidone | 40 | 35 | 60 | 30 | 30 | 35 | 40 | 40 | 20 |
| Rapeseed Oil | 55 | 20 | 0 | 0 | 0 | 0 | 0 | 0 | 25 |
| Palm Oil | 0 | 35 | 20 | 0 | 0 | 40 | 0 | 0 | 25 |
| Soybean Oil | 0 | 0 | 0 | 60 | 65 | 0 | 50 | 0 | 0 |
| Tall Oil Fatty Acids[1] "XTOL P" | 0 | 8 | 20 | 0 | 0 | 0 | 0 | 0 | 19 |
| D-Limonene | 5 | 2 | 0 | 0 | 0 | 0 | 0 | 0 | 5 |
| Tallow | 0 | 0 | 0 | 0 | 0 | 20 | 0 | 60 | 0 |
| Oleic Acid | 0 | 0 | 0 | 4 | 0 | 5 | 0 | 0 | 0 |
| "Bentone SD-2"[2] clay | 0 | 0 | 0 | 6 | 0 | 0 | 7 | 0 | 0 |
| "Aerosil R202"[3] thickener | 0 | 0 | 0 | 0 | 4 | 0 | 0 | 0 | 5 |
| "Span 80"[4] surfactant | 0 | 0 | 0 | 0 | 0 | 0 | 3 | 0 | 1 |
| "Monawet MO-70R"[5] surfactant | 0 | 0 | 0 | 0 | 1 | 0 | 0 | 0 | 0 |

[1]Product of Georgia-Pacific
[2]Product of Releox, Inc.
[3]Product of Degussa, Inc. (fumed silica)
[4]Product of ICI (sorbitan oleate surfactant)
[5]Product of Mona Industries (sulfosuccinate surfactant)

I claim:

1. A coating remover composition based in part on renewable resources comprising:
   (a) from about 20 to 80 weight percent of N-methyl-2-pyrrolidone;
   (b) from about 20 to 80 weight percent of an oil selected from the group consisting of soybean, tall, tung, castor, sunflower, sesame, tallow, coconut, palm, cottonseed, peanut, olive, pine, linseed, rapeseed, corn, fish, whale and mixtures thereof;
   (c) from 0 to about 50 weight percent of a cosolvent selected from the group consisting of one or more of aliphatic and aromatic hydrocarbons, terpenes, alcohols, glycols, carboxylic acids, aminoalcohols, nitriles, ethers, ketones, esters, glycol ethers, and glycol ether esters;
   (d) from 0 to about 10 weight percent of a surfactant; and
   (e) from 0 to about 15 weight percent of a thickener.

2. The composition of claim 1 wherein the surfactant is selected from the group consisting of one or more of polyoxyethylene derivatives of aromatic and aliphatic alcohols, alkali metal salts of $C_8$ to $C_{22}$ aliphatic sulfates, alkali metal salts of alkyl aromatic sulfonates, and dialkyl sulfosuccimates.

3. The composition of claim 1 wherein the thickener is selected from the group consisting of paraffinic waxes, fumed silica, fatty acid salts, organoclays, alkylated cellulose derivatives, esterified cellulose derivatives, and oxyalkylated cellulose derivatives.

4. A coating remover composition based in part on renewable resources comprising:
   (a) from about 30 to 50 weight percent of N-methyl-2-pyrrolidone;
   (b) from about 50 to 70 weight percent of an oil selected form the group consisting of soybean, tall, tung, castor, sunflower, sesame, tallow, coconut, palm, cottonseed, peanut, olive, pine, linseed, rapeseed, corn, fish, whale, and mixtures thereof;

(c) from 0 to about 50 weight percent of a cosolvent selected from the group consisting of one or more or aliphatic and aromatic hydrocarbons, terpenes, alcohols, glycols, carboxylic acids, aminoalcohols, nitriles, ethers, ketones, esters, glycol ethers, and glycol ether esters.

(d) from 0 to about 10 weight percent of a surfactant; and (e) from 0 to about 15 weight percent of a thickener.

5. The composition of claim 4 wherein the surfactant is selected from the group consisting of one or more of polyoxyethylene derivatives of aromatic and aliphatic alcohols, alkali metal salts of $C_8$ to $C_{22}$ aliphatic sulfates, alkali metal salts of alkyl aromatic sulfonates, and dialkyl sulfosuccimates.

6. The composition of claim 4 wherein the thickener is selected from the group consisting of paraffinic waxes, fumed silica, fatty acid salts, organoclays, alkylated cellulose derivatives, esterified cellulose derivatives, and oxyalkylated cellulose derivatives.

7. A coating remover composition based in part on renewable resources comprising:

(a) from about 30 to 50 weight percent of N-methyl-2-pyrrolidone;

(b) from about 50 to 70 weight percent of an oil selected from the group consisting of soybean, tall, tung, castor, sunflower, sesame, tallow, coconut, palm, cottonseed, peanut, olive, pine, linseed, rapeseed, corn, fish, whale, and mixtures thereof;

(c) from about 10 to 35 weight percent of a cosolvent selected from the group consisting of one or more or aliphatic and aromatic hydrocarbons, terpenes, alcohols, glycols, carboxylic acids, aminoalcohols, nitriles, ethers, ketones, esters, glycol ethers, and glycol ether esters.

(d) from 0 to about 10 weight percent of a surfactant; and (e) from 0 to about 15 weight percent of a thickener.

8. The composition of claim 7 wherein the cosolvent is methyl tert-butyl ether.

9. The composition of claim 7 wherein the cosolvent is selected from the group consisting of glycol ethers and glycol ether esters.

10. The coating remover composition of claim 7 wherein the surfactant is present within the range of from about 1 to 5 weight percent.

11. The coating remover composition of claim 7 wherein the thickener is present within the range of from about 3 to 10 weight percent.

12. A coating remover composition based in part on renewable resources comprising:

(a) from about 30 to 45 weight percent of N-methyl-2-pyrrolidone;

(b) from about 30 to 45 weight percent of an oil selected from the group consisting of palm, corn, rapeseed, and soybean;

(c) from about 10 to 40 weight percent of a terpene selected from the group consisting of limonene, cedrene, beta-pinene, and turpentine.

13. The composition of claim 12 wherein the oil is soybean and the terpene is turpentine.

14. A method of removing a coating from a substrate comprising:

(a) applying the coating remover composition of claim 1 to a substrate having one or more coating layers;

(b) allowing the substrate and coating remover composition to remain in contact for a period of time sufficient to loosen the coating; and (c) physically separating the coating and coating remover composition from the substrate.

15. The method of claim 14 wherein the substrate and coating remover composition are allowed to remain in contact at a temperature within the range of about 20° C. to 200° C.

16. A method of removing a coating from a substrate comprising:

(a) applying the coating remover composition of claim 4 to a substrate having one or more coating layers;

(b) allowing the substrate and coating remover composition to remain in contact for a period of time sufficient to loosen the coating; and (c) physically separating the coating and coating remover composition from the substrate.

17. A method of removing a coating from a substrate comprising:

(a) applying the coating remover composition of claim 7 to a substrate having one or more coating layers;

(b) allowing the substrate and coating remover composition to remain in contact for a period of time sufficient to loosen the coating; and (c) physically separating the coating and coating remover composition from the substrate.

18. A method of removing a coating from a substrate comprising:

(a) applying the coating remover composition of claim 12 to a substrate having one or more coating layers;

(b) allowing the substrate and coating remover composition to remain in contact for a period of time sufficient to loosen the coating; and (c) physically separating the coating and coating remover composition from the substrate.

* * * * *